United States Patent [19]

Russo

[11] Patent Number: 5,619,247
[45] Date of Patent: Apr. 8, 1997

[54] STORED PROGRAM PAY-PER-PLAY

[75] Inventor: James Russo, Ann Arbor, Mich.

[73] Assignee: Smart VCR Limited Partnership, Birmingham, Mich.

[21] Appl. No.: 394,380

[22] Filed: Feb. 24, 1995

[51] Int. Cl.$^6$ ......................................................... H04N 7/00
[52] U.S. Cl. ................................................ 348/3; 348/10
[58] Field of Search ................................. 348/3, 7, 5, 10, 348/6, 5.5, 13, 12; 455/4.1, 4.2, 2; H04N 7/00, 7/10, 7/14

[56] References Cited

U.S. PATENT DOCUMENTS

| | | | |
|---|---|---|---|
| 4,528,589 | 7/1985 | Block et al. | 348/10 |
| 4,535,355 | 8/1985 | Arn et al. | 358/123 |
| 4,590,516 | 5/1986 | Abraham | 358/86 |
| 4,621,285 | 11/1986 | Schilling et al. | 358/120 |
| 4,623,920 | 11/1986 | Dufresne et al. | 358/122 |
| 4,710,955 | 1/1987 | Kauffman | 380/10 |
| 4,755,872 | 7/1988 | Bestler et al. | 348/3 |
| 4,792,848 | 12/1988 | Nussralla et al. | 358/86 |
| 4,792,849 | 12/1988 | McCalley et al. | 358/86 |
| 4,796,299 | 1/1989 | Hamilton | 380/14 |
| 4,878,245 | 10/1989 | Bradley et al. | 380/10 |
| 4,885,775 | 12/1989 | Lucas | 380/10 |
| 4,893,248 | 1/1990 | Pitts et al. | 348/10 |
| 4,916,737 | 4/1990 | Chomet et al. | 380/20 |
| 4,949,187 | 8/1990 | Cohen | 348/3 |
| 5,003,384 | 3/1991 | Durden et al. | 358/84 |
| 5,027,400 | 5/1991 | Baji et al. | 380/20 |
| 5,124,980 | 6/1992 | Maki | 370/77 |
| 5,133,079 | 7/1992 | Ballantyne et al. | 455/4.1 |

OTHER PUBLICATIONS

W. Hodge, S. Mabon, J.T. Powers, Jr.; "Video On Demand: Architecture, Systems, and Applications"; *SMPTE Journal*, Sep. 1993, pp. 791–803.

*Primary Examiner*—Victor R. Kostak
*Attorney, Agent, or Firm*—Gifford, Krass, Groh, Sprinkle, Patmore, Anderson & Citkowski

[57] ABSTRACT

A stored program pay-per-play system includes a high-capacity storage medium facilitating compilation of video, audio or other programs at a subscriber's site. While the recording of such programs may take place at any time preceding playback, billing occurs only when, and if, the subscriber chooses to select a program for replay or actually enjoys the program substantially in its entirety. Billing is alternatively based on a store-credit or account debiting scheme. The recording of program materials may be directed automatically by subscriber-operated storage management facilities which scan program schedules and select materials to be recorded, based on title, cast, program genre or any other of a variety of viewer/listener preferences. Alternatively, the program provider may automatically download programs, either based upon actual or surmised viewer preferences, or at the provider's discretion, for example, using newly-available selections. Display generation circuitry is preferably implemented, enabling the viewer to review selections to be downloaded, those selections available for immediate replay, remaining account balance, and other features, including "parental lockout" and so forth.

23 Claims, 2 Drawing Sheets

STORED PROGRAM PAY-PER-PLAY

FIELD OF THE INVENTION

This invention relates generally to video storage and retrieval, and, more particularly, to a system capable of storing one or more pay programs, and wherein a user is responsible for payment only after a particular selection has been viewed or enjoyed.

BACKGROUND OF THE INVENTION

Despite the continuing publicity surrounding the prospects for true video-on-demand, the implementation costs involved in the delivery of programming on this basis remain prohibitive. In practice, a pay-per-view system might need to allocate a dozen or more "channels" for different viewers watching the same popular program, but offset in time by as little as one frame of video. When the utilization of the available transmission bandwidth is inefficient, the cost of delivery requires pricing levels that are unattractive to the viewer, particularly when compared with established delivery systems such as video rental stores or simply waiting for the movie to be scheduled on a premium cable channel.

As a consequence, current industry discussions are now centered around the concept of "near"-video-on-demand, in which the period of time a viewer is required to wait for a chosen program is minimized, typically by broadcasting the same program on several channels simultaneously, buy offset in time by multiples of 10 or 15 minutes. In this manner, viewers need only wait until the next starting time, and then tune their cable converter box to the appropriate channel. This approach has a major disadvantage . the viewer must arrange to see the program during one of the periods in which it is available on cable TV. If the program is only scheduled at times when the viewer cannot be present, then the only alternative is to attempt to videotape the program for viewing at a later date, which, in the case of pay-per-view, will require special arrangements, as these program purchases are typically implemented by placing a telephone call at the time the purchase is to occur.

The prior art discloses several attempts which address at least some of the issues involved in facilitating pay-per-view purchases. For example, Baji et al., U.S. Pat. No. 5,027,400, describe the hardware requirements for implementing a video-on-demand system on a bi-directional broadcast system, in which a collection of server computers manage program and commercial databases. Data are assembled into cells to be transmitted to individual subscriber systems, using an Asynchronous Transfer Mode (ATM) packet transmission system for the broadband transmission line. Orders for program materials from subscribers are entered via the subscriber's network terminal and terminal control unit, employing the same broadband transmission line for the necessary communications to execute the transaction. However, few of the currently installed cable systems are capable of bi-directional transmission, which limits the applicability of this type of system in the short term.

At the present time, pay-per-view systems usually are implemented by employing connections to telephone lines to execute the transaction and initiate the program delivery process. Stetten et al., U.S. Pat. No. 3,746,780, discloses the use of a separate and independent telephone communications link to enable access to stored audio and video material, and Abraham, U.S. Pat. No. 4,590,516, discloses an improved system for such an application.

While these references establish the basic requirements for a pay-per-view type of system, they do not adequately address the formidable communications problems associated with the nearly-simultaneous access of a large number of subscribers to the transaction facilities. Bestler et al., U.S. Pat. No. 4,755,872, discloses the use of the Automatic Number identification (ANI) services offered in many areas of the country, and exploit these capabilities to identify the subscriber and to forward the transaction information to the cable company's billing computer. A common feature of all of these systems is that the transaction (billing) occurs at the time the program is viewed, and this places a heavy burden on the communication facilities. In addition, completion of the ordering/billing transaction must precede the viewing of the program material.

Kauffman, U.S. Pat. No. 4,710,955, discloses a method and apparatus for implementing bi-directional communications between the billing computer and the subscriber apparatus. In this approach, the actual billing process is on a non-real-time basis, using a method referred to as "store-and-forward". Here, the subscriber purchases program credits (stored in the subscriber's terminal facilities) in advance, and these credits are debited when an order is placed for programming. The actual billing is recorded when a telephone communications link is established between the subscriber terminal and the cable company billing computer, at which time the subscriber's terminal reports the purchase to the billing computer. Although not explicitly disclosed, it is clear that a subscriber with good credit could be allowed to purchase a program even though he did not have an adequate supply of credits, and tile supply could be replenished automatically when the subscriber's terminal unit contacts the billing computer.

A separate aspect of these systems is the method by which the security is implemented. It is the usual practice for a cable company to employ any of several well-known techniques for "scrambling" the premium channel program material, and rely on the subscriber's terminal facilities to de-scramble the signals for viewing. This de-scrambling process is authorized by the cable company's billing and transmission facilities, employing either the broadband transmission line or a separate telephone communication link. Am et al., U.S. Pat. No. 4,535,355, Schilling et al., U.S. Pat. No. 4,621,285, Hamilton, U.S. Pat. No. 4,796,299, and Chomet et al., U.S. Pat. No. 4,916,737, disclose various methods for implementing the security by employing encryption keys and other such data security techniques.

Yurt et al., U.S. Pat. No. 5,132,992, disclose an audio/video transmission system which includes provisions for storage of program content at the cable system facility, at intermediate data-compressed storage libraries, or at the subscriber terminal site. The system disclosed relies on a complicated method of assembling program data into blocks for distribution onto a variety of transmission media at a range of transmission rates, but does not guarantee a uniform data rate. As a result, the subscriber receiving terminal requires buffering in the form of digital data storage means, so that the program may be played back at a later time, in real-time.

All of the systems discussed herein share the common feature that the purchase transaction occurs at the time of the program transmission, although the act of recording of the billing may be delayed for a period of time. If for any reason the viewing is interrupted or terminated, the viewer has no means by which he may cancel the transaction.

SUMMARY OF THE INVENTION

The present invention discloses a method and apparatus by which an audio or combined audio/video pay-per-play system may be implemented, thereby providing a subscriber with a much wider choice of program materials for enjoyment at the subscriber's convenience. In the preferred embodiment, the subscriber has magnetic, optical, or magneto-optical storage means by which program material may be recorded for later playback. While the recording itself may take place at any time preceding playback, billing occurs only when, and if, the subscriber chooses to select a program for replay or actually enjoys the program substantially in its entirety. The billing may alternatively be based on a stored-credit billing or account debiting scheme.

The recording of program materials may be directed automatically by subscriber-operated storage-management facilities, which could scan program schedules and select materials to be recorded, based on title, cast, program genre or viewer/listener preferences. These storage-management facilities could enable the subscriber to discard programs after replay, or remove programs that the subscriber has decided not to enjoy, and would be capable of including a wide range of input and output facilities. Where necessitated by royalty arrangements, the storage-management facilities may provide in an alternative embodiment, records of which subscribers have actually replayed (and not just stored) program material. In an alternative embodiment, storage facilities could be made available to subscribers from regional program server computers, or even designated program storage means located at a centralized distribution facility, such as a cable provider.

DETAILED DESCRIPTION OF THE PREFERRED EMBODIMENT

Figure 1:
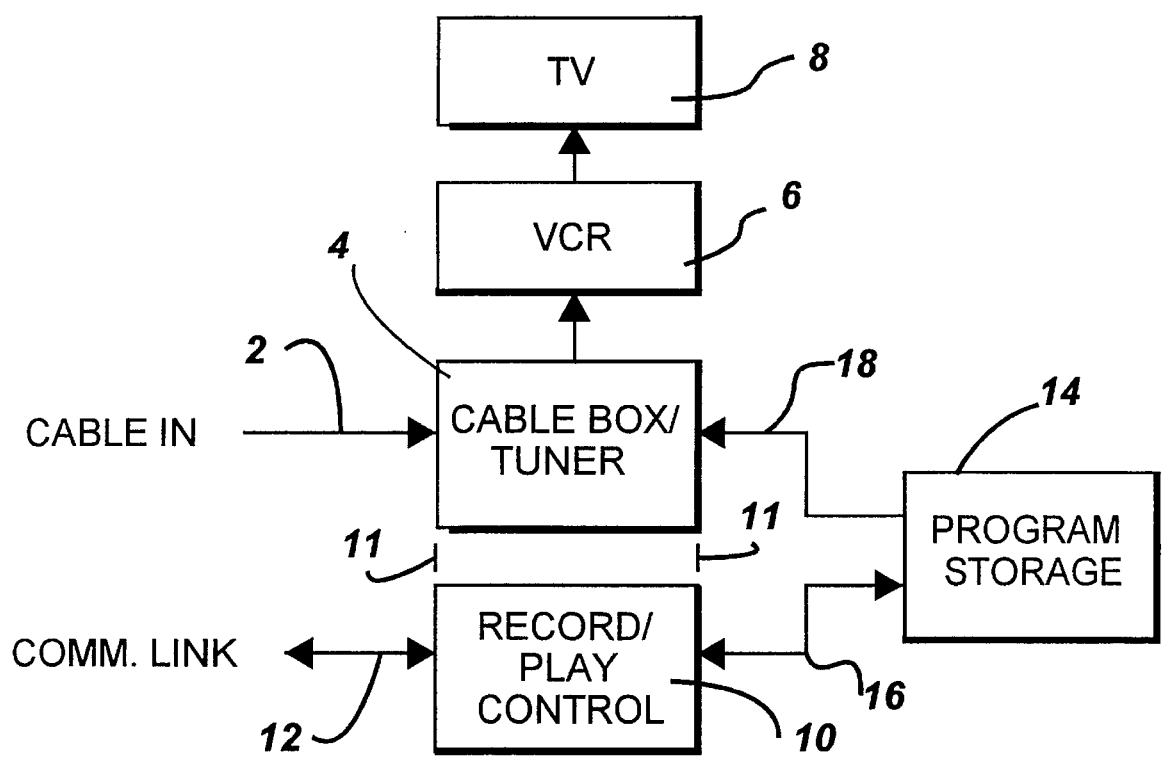
FIG. 1 is a block diagram depicting major components in the stored-movie pay-per-view system.

The details of the invention will become evident with reference to FIG. 1, which depicts the facilities provided at a subscriber site. Although this discussion centers on cable delivery in general and video programming in particular, other delivery media and programming, including audio-only, video games, etc., are easily accommodated as alternatives. The typical connection to the broadband cable system 2 provides the usual conventional video program services to cable converter box 4. In cable systems offering premium services, it is typical to use such a converter box 4 as part of system security, to perform any necessary de-scrambling of the premium program signals. In most homes, the output of the cable converter box 4 is connected to a VCR 6, and the output of the VCR, in turn, is connected to the television set 8 or video monitor. If no VCR is installed at a particular television set, then the output of the cable converter box would typically be connected directly to the television set. For uni-directional cable systems (which have no provisions for data to be sent from the subscriber-terminal/converter-box back to the cable system facilities), a separate communications link 12 may be supplied for interacting with the cable system billing and/or ordering facilities. In the case of a bi-directional system, these features would preferably be implemented by way of the cable converter box itself.

In practice, it may be advantageous to implement both the cable box 4 and record/play controller 10 as a single unit, as suggested by the broken lines 11 in FIG. 1. In such a configuration, the controller may be utilized in either uni-directional or bi-directional environments. The controller 10 optionally may include various devices (not shown) for user input and controller output, such as keyboard units, bar-code scanners, infrared remote-control units, integrated CRT displays, on-screen television displays, voice-activated input or computer-generated voice output, or touch-screen accessories to be fitted either to the CRT facilities or to the television set 8.

Selected program materials preferably may be stored in the program storage unit 14, comprised of magnetic, optical, or magneto-optical discs, or any of the various magnetic-tape-based storage media. The storage technique employed may be sophisticated for example, by recording data-compressed information on arrays of disks or magnetic tapes, including auto-changer facilities to switching between media, or more straightforwardly, for example, using a conventional VHS video cassette recorder, preferably with extended recording time. Whereas standard cassettes have recording times as long as 8 hours, special cassettes with capacities of 10 hours or more recording time are currently available.

Program signals are preferably supplied to the program storage unit 14 through a cable box tuner 4. In the case that program signals are recorded using some form of signal scrambling, either the program storage unit or the cable converter box will incorporate provisions for descrambling the signal during playback.

In the preferred embodiment, the program storage unit 14 preferably is located at the subscriber site. However, in an alternative embodiment, the physical storage could be a part of a larger storage unit located at the cable transmission facility, or at one of several intermediate storage facilities, for example, serving groups of subscribers, located ill the transmission paths between the cable transmission facility and the subscriber sites. In this case, the subscriber would be allocated a specific portion of the overall storage capacity available, and would be able to use than storage capacity as desired. In this manner, the cable operation could continue to offer programming in accordance with a predetermined schedule, but individual subscribers may choose to purchase the near-video-on-demand feature, if so desired. This would obviate the need for the cable system to be equipped to supply full video-on-demand service for all subscribers immediately.

Regardless of the specific method chosen, the record/play controller 10 will perform the necessary tasks associated with program storage management. The controller preferably includes a microprocessor and appropriate communication facilities for the type of communication link employed and the method of program storage available. In a basic form, the controller merely keeps track of programs as they are recorded, completing the purchase transaction when the programs are viewed. It also preferably provides for the erasure of the programs when the subscriber no longer desires to keep them in a library. However, with the addition of program schedule information from the cable transmission facility, it is possible to greatly expand the capabilities of the program storage system described herein. For example, the record/play controller could be programmed to record desired materials over an entire month, or could be programmed to record any "Western" movie, or even any "Western" movie having a particular actor listed in its cast. As the programs are collected, the subscriber is able to view them in any order desired, and at any desired time. Using well-known techniques such as "parental lockout" or passwords, a subscriber may also be able to control access to the stored programs by children or unauthorized viewers.

A key feature of the system concerns the fact that although there may be many programs stored, no program will be billed for until it has been selected for viewing or, more preferably, actually viewed. Thus, if a subscriber chooses to erase a program contained in the program storage unit before he has viewed that program, then he will not incur a charge for having added the program to the program storage unit library. Because the program is already available, there is no requirement to complete the billing transaction within any particular time frame.

As mentioned, in the preferred embodiment, payment will not be due until the program has been viewed substantially in its entirety. That is, as with a rented cassette, the viewing of a movie is not limited to contiguous viewing, but in the event that viewing is stopped and restarted, for whatever reason, including the viewing of another program on an intervening basis, the system will automatically keep track of where viewing left off, and restart from that point until such program has been viewed substantially in its entirety, even if in piece-meal fashion. The term "substantially" is used, since it would not be appropriate to enable a viewer to watch all of a movie but the final credits and avoid payment by stopping at that point. Thus, in the preferred embodiment, payment will preferably come due once the majority or some high percentage of the program has been watched. Alternatively, payment may be transferred or earmarked to the provider once a program is selected for viewing, but if viewing were to be terminated shortly thereafter and never resumed, the system might automatically re-credit the subscriber for that program, since it was largely unwatched. Such a scheme is in keeping with allowing a viewer to enjoy a free "preview"0 of a program, as described elsewhere herein.

Also in conformance with cassette rental, in an alternative embodiment of the invention, a viewer may be allowed to view a selected program as many times as desired over a particular, predetermined period of time without incurring any additional charges. This is in keeping with a one- or two-day movie rental which is associated with a single charge, but which enables a renter to view the program as many times as desired until the cassette is due back at the store. Thus the system according to this invention may keep track of such time periods, and, if the viewer chooses to keep a particular program in the storage library beyond this time period, further viewing may be treated as an additional "rental" of that program having the same or, perhaps, reduced charges associated with the viewing thereof.

The system preferably displays a list of prerecorded programs now available for viewing and, having viewed a particular selection, the system preferably prompts the viewer with a query regarding whether or not that program should be kept in the library. As such, a system according to this invention may be called upon to keep track of considerable information regarding program viewing, not only will titles and other information pertaining to previously recorded programs preferably be available for review, but also program length, and a percentage of the program which has already been viewed, perhaps including the last date associated with the viewing of that program. In the event of a credit account, the system is preferably further capable of displaying information relating to the balance remaining. Such information is displayed on an associated video monitor or TV receiver using a graphic display generator and related circuitry which will be described in more detail with reference to FIG. 2.

In the preferred embodiment, until a program has been substantially viewed in its entirety, it is assumed that various VCR-like controls associated with that program will be made available, free of charge, until payment is triggered. For example, if a program has not been viewed for a long time, it may be appropriate to rewind that program, or to pause at various points, in order to recall the subject matter. It should also be possible to fast forward through portions of the program already viewed without incurring any penalties as well.

In a typical one-way cable or pay-per-view satellite system, a user communicates to a program provider, by mail or more commonly, by phone, to take advantage of a particular service. The provider then broadcasts a code specifically addressed to the subscribers decoder, thereby unlocking these features, for example, providing the subscriber's site with a key capable of descrambling an encrypted program. The present invention may make general use of this scheme, though, rather than provide a code or a key associated with a particular channel or program, the provider preferably unlocks an amount of viewing, either in terms of a number of hours or a level of credit, either of which may be used by a particular subscriber as desired. As mentioned, with the ability to view the remaining credit balance, a customer may readily communicate again with the provider to increase the reserve available for viewing. The provider may then bill for the amount of credit requested, either as it is used, or at the time of the request before actual use. In the event that the system is two-way in nature, the provider may sense when actual use occurs, and debit the account accordingly. Whereas, with a one-way system, program selection and actual use information will be communicated through another medium, for example in advance, through mail or phone, as already discussed, or, alternatively, with separate RF or computer network interconnection to the provider.

The record/play controller may further be programmed to initiate a communication with the cable transmission facility at periodic intervals, as an example, on a bi-weekly basis. As an alternative, the record/play controller could communicate directly with a credit-card clearing house, eliminating the need to keep any records of viewing credits or debits, or to purchase these credits in advance. This billing method also addresses the issue of subscriber privacy, since the cable company would receive lump-sum payments allocated according to the number of purchasers of a particular program, but would not necessarily receive the detailed information identifying the programs ordered by a particular subscriber. Once the transaction has been registered by the record/play controller, relevant signal de-scrambling facilities would be enabled, allowing the program to be viewed. Of course, in the event of a credit account, a descrambling key may be generally available for use by the subscriber at the subscriber's site without having to download such a key on a per-selection basis, assuming the credit of the viewer is in good standing.

Figure 2:
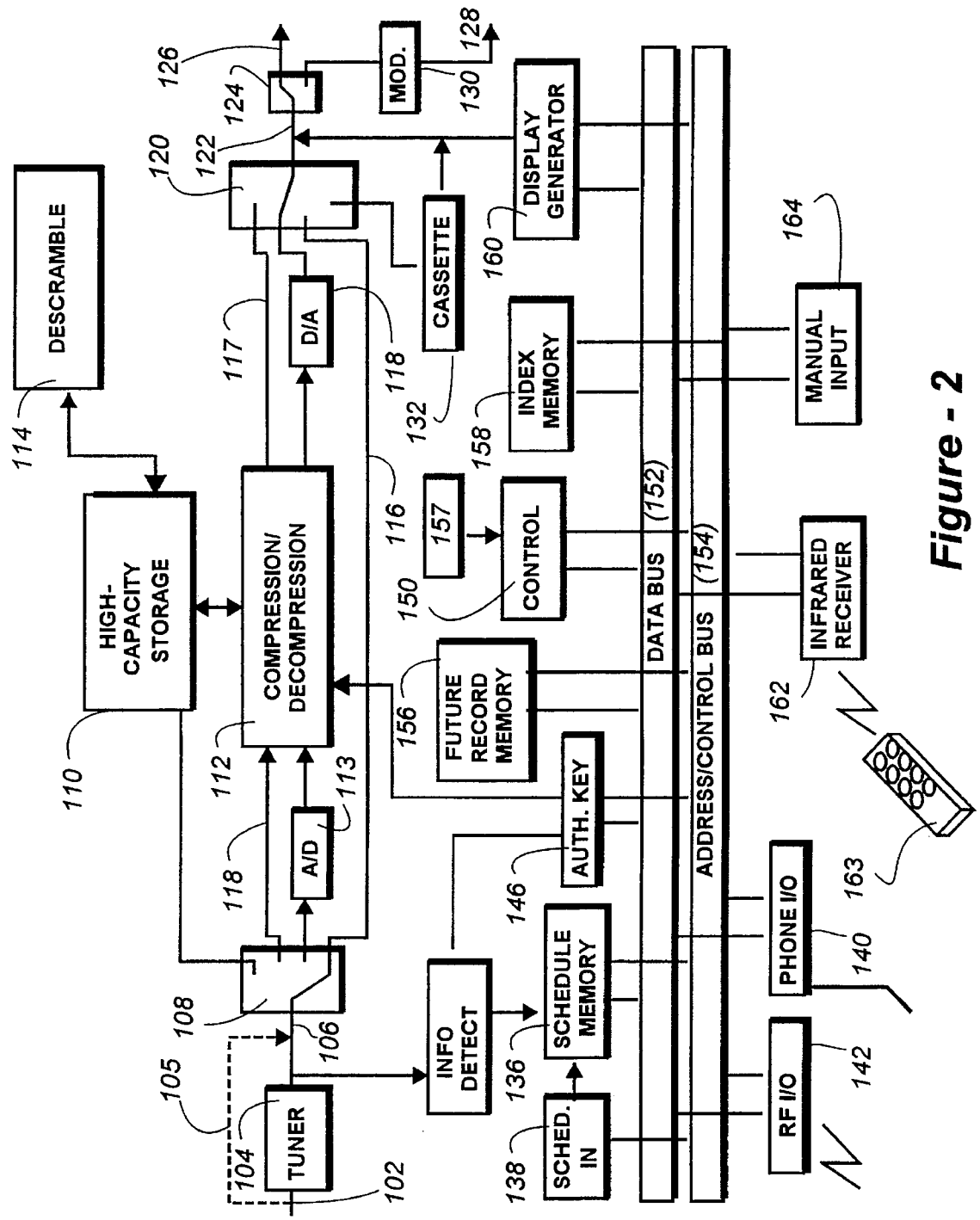
FIG. 2 is a more detailed block diagram of a comprehensive system according to the invention.

FIG. 2 provides a more detailed diagram illustrating a more comprehensive embodiment of the invention. Program information is received along line 102 and, if derived from a multi-channel source such as a cable input, demodulated by tuner 104 to produce a baseband signal along path 106. In the event that line 102 already carries a baseband signal, for example, in the case of a separate tuning facility forming part of a remote or independent associated unit, tuner 104 may be bypassed as indicated by the broken line 105.

While the following discussion is again primarily concerned with the storage and retrieval of video information, the reader is reminded that audio information also falls within the scope of this invention, either as the audio information typically included with video information or as audio information only, applied simply as high quality sound, including stereo sound, whether in analog or digital form. Thus, though line 102 may in one sense be regarded as a cable television input or feed from a satellite receiver, or the like, the teachings of this invention may be readily extended to audio-only embodiments, wherein, for example, one or more cable channels may be used to carry numerous audio selections which may be recorded at the site of the operator. In keeping with the basic premise of the invention, however, fees or royalties will not be accounted to a listener until such time as the audio selections are actually selected for enjoyment. The audio information broadcast may either be of a general nature, i.e., not directed toward a particular listener or group, in which case the system of the invention records some or all the musical selections based upon input criteria, including listener preference. Alternatively, a user may identify a particular tune for immediate reception, in which case, owing to the wide bandwidth available through a multi-channel cable source in particular, may be downloaded immediately, and listened to at that time, paid for concurrently. As with the distribution of video material, an audio selection or selections may be transferred in digitally compressed form.

The baseband signal, which will be generically termed a baseband video signal, present along path 106, is preferably fed to a video switch 108 under control of a central controller 150. The purpose of this switch 108 is to route received program information to one or more of a variety of destinations. For example, in the event that received program information is already in digitally compressed form, as might be the case with certain newly diverging digital satellite receiver systems, incoming program information may be routed directly to a high capacity digital storage medium 110 along path 109.

In the preferred embodiment, block 110 represents a disk drive having a capacity at least in the range of hundreds of megabytes, and preferably in the range of a gigabyte or more. While a magnetic drive is preferable from the standpoint of relatively low cost-per-bit and compatibility with random-access read/write operations, other forms of high capacity storage media are equally applicable, including magneto-optical and purely optical forms, such as emerging read/write compact-disk read-only memories (CD-ROMs), and semiconductor modules. The use of a removable medium such as a CD-ROM further permits the ability to receive program material in a physically removable form as well as or in addition to an electronic transfer. For example, CD-ROMs having stored thereon multiple video or audio programs in digitally compressed form may be distributed by a program provider free of charge or for a nominal fee, through the mail or through record or video outlets. These disks may be installed within the system of the invention, but again, a desired video and/or audio selection will only be paid for by the viewer/listener when a particular program is actually viewed or heard. The distribution of such program material in digitally compressed form offers an inherent form of security relating to the distribution thereof, since proprietary authorization keys may be used to ensure that decompression is only possible at those sites authorized to enjoy program selection, i.e., those sites having good credit with respect to a provider of the program material.

In the event that the program material is received in digital form but not compressed, compression/decompression block 112 may advantageously be provided to ensure that the largest amount of program information may be contained within high capacity storage unit 110. The compression/decompression block 112 may be based upon a commercially available engine, for example a device based upon the standard techniques such as MPEG or, alternatively, it may be desirable, particularly with regard to the protection of the program provider, to incorporate in block 112 a proprietary compression/decompression algorithm so as to discourage unauthorized copying. As a further measure of security, the algorithm used by block 112 may in fact be programmable, in which case digital signals relating to the algorithm to be used may be downloaded on a predetermined or occasional basis.

In the event that the program material received is in analog form, as would be the case with most cable, satellite and off-air broadcasts, an analog-to-digital 113 may be used prior to storage within the high capacity medium, again, preferably using compression made possible by block 112. Yet another position of the switch 108 allows the program material received over line 106 to be routed directly to a different switch 120 responsible for a selecting program material from a particular source for actual viewing or listening. Direct transfers of program information would thus be provided along 116 and with switch 120 properly controlled may be output along line 122 to yet another switch 124 which selects either a direct video output 126 for use with monitors which accepts such direct inputs, or, alternatively, to modulated output 128, the signal having been modulated onto a particular channel behind modulator block 130. Such direct program transfers along line 116 would typically be used in the event that received program information does not carry with it a charge for the viewing or listening thereof.

In the event that the program material to be enjoyed has been compressed, decompression may be used within block 112, outputting the signal along path 117, which is alternatively selectable by switch 120, thus outputting digital information of line 122 to switch 124 and outputting such digital information in the event that a fully digital monitor is available for use with the system. In the event that an analog receiver or television is to be used, however, as would be the case of most situations today, the compressed digital program material would be converted into analog by block 118 and selected by switch 120 for subsequent output.

As mentioned, the embodiment shown in this figure is particularly comprehensive, and a wide range of features are provided. One of these is the addition of a second program storage facility, preferably in the form of a conventional tape recorder (VTR), which would record onto removable cassettes as implied by block 132. The addition of the VTR enables the system of the invention to operate as a standard VCR type of equipment, enabling the operator to play pre-recorded cassettes or record programs based upon some or all of the program loading mechanisms just described. Additionally, as the invention is further suited to audio capabilities, block 132 may further represent a separate sound recording device, such as an audio tape player.

in the preferred embodiment, a supplemental information detector block 134 is configured as shown to detect information from one or more program providers along with the program information itself. Several types of supplemental information are possible, including future schedule memory information which will be loaded into a schedule memory 136 upon receipt, but additionally, authorization keys and information relating to compression algorithms may further be received in the form of supplemental information, and subsequently loaded into separate storage block 146. It should also be noted that, while in the preferred embodiment such supplemental information may be derived from the program provider along path 102, either in an unused portion of one or more channels or through the use of an unused channel in its entirety, such supplemental information may alternatively be acquired either through a telecommunications facility depicted by block 140 or through an RF receiver depicted by block 142. In the case of the telecommunications subsystem, it is implied that block 140 includes dialing capabilities, modulation/demodulation capabilities, and so forth, enabling the system to automatically dial out to a predetermined number and receive such supplemental information through an automatic process without requiring assistance.

The use of a telecommunications capability, over a standard telephone line, for example, is the preferred method according to the invention for communicating with a program provider or service center in terms of authorization, billing and account-related transactions. In the case of the RF I/O block 142, the preferred embodiment and authorized radio frequency is preferably used, such as an FM sideband authorized to provide SCA subcarrier transmissions. Such sidebands are now widely used for background music, pagers, and so forth, and may likewise be used in conjunction with this invention, particularly in the case of user authorization, billing and accounting purposes.

It is preferred that all control functions be carried out by a central controller 150, preferably in the form of a microprocessor or single-chip microcomputer of commercial design, which are available by various manufacturers such as Intel Corporation and Motorola, Inc. The controller 150 communicates with most of the functional blocks of a system over a bi-directional data bus 152, and address/control lines used to select a particular subsystems and memory storage areas to carry out the various functions. User controls preferably include an infrared receiver 162 receiving IR signals from the remote hand-held unit 163. Alternatively, a manual input 164 may be provided, which would support the user I/O devices such as pushbuttons and a readout display on the enclosure of the system.

Future schedule information, either derived in the form of supplemental information through one of the transmission mechanisms described earlier or, alternatively, in the form of a separate schedule input. mechanism 136, for example in the form of plug-in read-only memories or schedule CD-ROMs, may be output using switch 124 for display on attached monitor, thus enabling the operator to peruse a currently available or upcoming selections. U.S. Pat. No. 4,908,713, for example, discloses hardware and methods which may be used in conjunction with this invention for the purposes of selecting such information for transfer to a future record memory 156 which, in conjunction with real-time clock 157 will enable the automatic and unattended recording of a desired program. In this preferred embodiment of the system, an index memory 158 is additionally provided, which, in conjunction with display generator,160, further enables an operator to view both selections which have been recorded, either through direct specification, or through the use of database techniques, which result in the automatic recording of one or more selections based not upon an exact selection, but upon viewer preferences from which a desired program might be implied. Thus, various criteria may be used in order for a movie to be stored for subsequent replay. In most cases, a user may be given a list of titles available, from which to make direct choices. Alternatively, however, the user may select broader categories from which movies may be automatically downloaded, based upon particularly viewing preference. Another, further, option is to enable the program provider to make a decision concerning the downloading of at least certain of the programs to be stored at the subscriber's site. An example might be the initial availability of a first-run movie, these being typically in the greatest demand at cassette rental houses. Yet a further option is for selections to automatically be downloaded based upon what has been previously viewed and, in this case, two variances may be used, including those programs which have been previously selected for storage, and secondly, of potentially greater relevance, those stored programs which have been selected to be viewed and paid for.

Regardless of how the recorded program materials result in being recorded and resident in high capacity storage block 110, the operator or account location responsible for the control of the system will not be charged until a program is actually selected to be output and watched and/or listened to. The triggering of account debit may occur at different points, associated with the selection of the desired program, though, preferably, a debit will be triggered by a "play" command, which, in the case of a scrambled or digitally-compressed selection, the occurrence of a debit may be tied to the use of decompression made possible by block 112 or descrambling carried out by block 114.

In any case, once a pay-type selection has been made, an account is either debited immediately, or a memory associated with the authorization key 146 is modified which may later be queried remotely, for example, through the phone I/O block 140, to inform the program provider that one or more pay programs were selected for viewing and/or listening. In the preferred embodiment, the subscriber will set up an account with a program provider which will advance a predetermined amount of credit or an open-ended line of credit. Preferably, the program provider will keep track of programs that have been selected for output, and debit the account and send a periodic invoice. In the event that the program provider is supplied with a credit card number, pay selections may automatically be debited therefrom, in which case the operator need only be sent a statement of credit purchases made.

As an alternative to the storage of credit information at the site of the program provider, the system may itself store all requests for viewing of a pay program, in which case the program provider may only query the storage to determine a debit amount on a batch-transfer basis. In the event that a site has used up its credit or represents a history of credit abuse, codes may be downloaded by the provider to ensure that any pay programs remaining in the high capacity storage block 110 may not be decompressed or descrambled without further authorization.

In operation, one taking advantage of the system energizes the apparatus and an accompanying television or monitor, and uses the remote control or enclosure-supported controls to review those programs previously recorded onto the high-capacity medium, and which are now available to be enjoyed. In the preferred embodiment, the operator is able to scroll through at least the titles of the stored programs or, alternatively, using database techniques similar to those used for recording one embodiment of the invention, review recorded programs in terms of program type, length, and so forth. Preferably the operator uses an on-screen cursor to scroll through the various available selections. Once selected to be viewed or played, and only at such time, is the account associated with that particular system charged or debited. As mentioned, the mere selection of a program for viewing may not instantly result in a charge, but the operator may instead be entitled to enjoy the program for a predetermined amount of time after which a charge will take place. Preferably, a warning will also appear on the screen and indicate the amount of time remaining for this free preview. For example, by means of a count-down timer or clock, after which the program will continue, but now on a pay-per-view basis.

In the event that the individual cannot finish a particular program once selected for enjoyment, in a further alternative embodiment, the system will keep track of exactly where the operator left off and pick up at that point without an additional charge, thus ensuring that an operator is not charged twice for selecting the same program more than once. After enjoying the same program in its entirety, various options are available, including saving that program on the high-capacity medium as part of an on-site library, or alteratively, the selection may be automatically erased during or immediately subsequent its retrieval, to free up space on the high-capacity medium.

In one embodiment, the system may make available different storage areas for different members of a household or subscriber site with each potential viewer having his or her own program storage, preview information, and, account number. Thus, in a family with two children, each family member may have their own account with information being accessed on a password-type of basis. In terms of a parental lockout-type of feature, in the event that, for example, a parent wishes to curtail viewing of a particular program, this may be accommodated at various stages, including a lockout preventing view of titles and program-related information prior to reception of the program itself, or a lockout of the ability to select a program for viewing, including means to prevent the viewing of any portion thereof, including any free "previews."

Having described the invention, I claim:

1. A stored video program pay-per-view system adapted for use with an associated display device, comprising:

means for selecting a video program to be received at a subscriber's location, the viewing of the program having associated therewith a payment to a provider;

means for locally storing one or more such programs at the subscriber's without the subscriber incurring a viewing charge;

means for receiving, locally storing and reviewing information representative of a previously stored program, and for selecting a program to be viewed on the display device; and means, in communication with the means for selecting a program to be viewed, for ensuring payment to the provider, such payment not being due until a particular program has been selected for viewing.

2. The system of claim 1, wherein payment is due only after a program has been selected for viewing and substantially viewed in its entirety.

3. The system of claim 2, further including means enabling a viewer to stop and re-start the viewing of a selected program without payment being due until such program has been substantially viewed in its entirety.

4. The system of claim 3, the means for reviewing information representative of a previously stored program including information relating to the extent to which a program has been viewed, including any stopping and re-starting of the program.

5. The system of claim 1, further including means enabling multiple viewers to locally store programs and information representative of such programs on an individualized basis.

6. The system of claim 1, further including means whereby one viewer may control the ability of another viewer to select a video program to be received.

7. The system of claim 1, further including means enabling a viewer to watch a selected program any number of times during a predetermined period of time without an additional payment being due.

8. The system of claim 1, wherein the means for selecting a video program to be received at a subscriber's location further includes:

means for providing a list at the subscriber's location of currently available programs; and means for selecting programs from the list to be stored, including programs to be broadcast at a future time.

9. The system of claim 1, wherein the means for selecting a video program to be received at a subscriber's location is controlled at the location of the provider.

10. The system of claim 9, including means for automatically providing programs to a subscriber's location based upon categorical criteria.

11. The system of claim 1, wherein the means for ensuring payment to the provider includes the transfer of program selection information to the provider after the program has been selected for viewing.

12. The system of claim 1, wherein the means for ensuring payment to the provider includes a transfer of funds prior to the viewing of a pay program.

13. A stored program pay-per-view system situated at a subscriber's location, comprising:

an input to receive a pay video program from a provider;

an output to deliver the program to a display device for viewing;

means for locally storing one or more such programs at the subscriber's location without the subscriber incurring a viewing charge;

means to receive and display program-related information, enabling a program to be selected for reception and storage;

a memory to store program-related information associated with a previously stored program;

display generation circuitry enabling the program-related information associated with a previously stored program to be viewed on the display device, so that a stored program may be selected for viewing; and means to communicate to the provider that a program has been selected for viewing, enabling the provider to receive the payment associated with the viewing of the program.

14. The stored program pay-per view system of claim 13, further including data compression/decompression means to store a received program in digitally compressed form.

15. The stored program pay-per view system of claim 13, wherein the input to receive a pay video program from a provider includes in a bi-directional cable system forming a portion of the means to communicate to the provider that a program has been selected for viewing.

16. The stored program pay-per view system of claim 13, further including means to receive a key to descramble a pay program in scrambled form, receipt of the key being in response to a communication to the provider that a program has been selected for viewing.

17. A stored program pay-per-view system situated at a subscriber's location, comprising:

an input to receive a pay video program from a provider;

an output to deliver the program to a display device for viewing;

means for locally storing one or more such programs without the subscriber incurring a viewing charge;

means to receive and store program-related information;

display generator means in communication with the output for displaying program-related information on the display device;

means to account for the viewing of a program, the output of which is connected in an information path to the provider;

a user interface; and a controller in communication with the program storage means, the means to receive and store program-related information, the display generator means, the means to account for the viewing of a program, and the user interface, the controller being operative, under user control through the interface, to perform the following functions:
  (a) cause the selective display of the program-related information, enabling a program to be selected for reception and storage,
  (b) cause program-related information associated with a previously stored program to be retained and selectively displayed, enabling a stored program to be selected for viewing, and
  (c) inform the provider of the program selected for viewing to ensure that the provider receives payment.

18. A stored program pay-per-play system, comprising:

an input for receiving a program from a provider, enjoyment of the program having a payment associated therewith;

means for locally storing a plurality of such programs received through the input without the provider demanding the payment associated therewith;

means for reviewing a previously stored program and for selecting a program to be enjoyed; and means, in communication with the means for locally storing one or more programs, for providing payment from the user to the provider of a program, but only after that program has been selected for enjoyment.

19. The system of claim 18, including a video program.

20. The system of claim 18, including an audio program.

21. The system of claim 18, wherein the means for providing payment from the user to the provider of a program includes an electronic funds transfer prior to the enjoyment of the program.

22. The system of claim 18, wherein the means for providing payment from the user to the provider of a program includes the debiting of an account previously established between the user and the program provider.

23. The method of compensating a pay program provider, comprising the steps of:

receiving, at a subscriber's location, a pay program from a provider;

locally storing the program along with information relating to the program;

selecting the program to be played; and compensating the provider only after the program has been substantially played in its entirety.

* * * * *